(12) United States Patent
Ma et al.

(10) Patent No.: US 7,304,799 B2
(45) Date of Patent: *Dec. 4, 2007

(54) TUNABLE OPTICAL FILTER WITH HEATER ON A CTE-MATCHED TRANSPARENT SUBSTRATE

(75) Inventors: Eugene Yi-Shan Ma, Chestnut Hill, MA (US); Mitchell S. Cohen, Bedford, MA (US)

(73) Assignee: Aegis Lightwave, Inc., Woburn, MA (US)

( * ) Notice: Subject to any disclaimer, the term of this patent is extended or adjusted under 35 U.S.C. 154(b) by 24 days.

This patent is subject to a terminal disclaimer.

(21) Appl. No.: 10/960,764

(22) Filed: Oct. 7, 2004

(65) Prior Publication Data

US 2005/0105185 A1    May 19, 2005

Related U.S. Application Data

(60) Provisional application No. 60/509,203, filed on Oct. 7, 2003.

(51) Int. Cl.
*G02B 27/00* (2006.01)

(52) U.S. Cl. ......................... 359/578; 359/579; 359/577

(58) Field of Classification Search ................ 359/578, 359/579, 245, 290, 291; 73/204.23; 385/10
See application file for complete search history.

(56) References Cited

U.S. PATENT DOCUMENTS

| | | | |
|---|---|---|---|
| 4,126,396 A | 11/1978 | Hartmann et al. | |
| 4,497,544 A | 2/1985 | Mitchell et al. | |
| 4,680,085 A | 7/1987 | Vijan et al. | |
| 4,885,622 A | 12/1989 | Uchiyama et al. | |
| 4,929,063 A | 5/1990 | Durand et al. | |
| 5,037,169 A | 8/1991 | Chun | |
| 5,072,120 A | 12/1991 | Siewick | |
| 5,162,239 A | 11/1992 | Winer et al. | |
| 5,185,272 A | 2/1993 | Makiuchi et al. | |
| 5,212,584 A | 5/1993 | Chung | |
| 5,218,422 A | 6/1993 | Zoechbauer | |
| 5,264,375 A | 11/1993 | Bang et al. | |
| 5,387,974 A | 2/1995 | Nakatani | |
| 5,408,319 A | 4/1995 | Halbout et al. | |
| 5,490,008 A | 2/1996 | Guempelein et al. | |
| 5,515,460 A | 5/1996 | Stone | |
| 5,528,071 A | 6/1996 | Russell et al. | |
| 5,539,848 A | 7/1996 | Galloway | |
| 5,599,403 A | 2/1997 | Kariya et al. | |
| 5,619,059 A | 4/1997 | Li et al. | |
| 5,694,498 A | 12/1997 | Manasson et al. | |

(Continued)

OTHER PUBLICATIONS

Cocorullo, Giuseppe, et al., Amorphous Silicon-Based Guided-Wave Passive And Active Devices For Silicon Integrated Optoelectronics, IEEE Journal Of Selected Topics in Quantum Electronics, Nov./Dec. 1998, p. 997, vol. 4, No. 6.

(Continued)

*Primary Examiner*—Audrey Y. Chang
(74) *Attorney, Agent, or Firm*—Kurt Rauschenbach; Rauschenbach Patent Law Group, LLC

(57) ABSTRACT

An optical device including: a glass substrate; a crystalline silicon layer bonded to the glass substrate; and a thermally tunable thin-film optical filter fabricated on top of the crystalline silicon layer.

14 Claims, 2 Drawing Sheets

U.S. PATENT DOCUMENTS

| | | |
|---|---|---|
| 5,708,280 A | 1/1998 | Lebby et al. |
| 5,742,630 A | 4/1998 | Jiang et al. |
| 5,751,757 A | 5/1998 | Jiang et al. |
| 5,753,928 A | 5/1998 | Krause |
| 5,767,712 A | 6/1998 | Takemae et al. |
| 5,790,255 A | 8/1998 | Jackson et al. |
| 5,812,582 A | 9/1998 | Gilliland et al. |
| 5,814,871 A | 9/1998 | Furukawa et al. |
| 5,940,008 A | 8/1999 | Kirkby |
| 5,942,050 A | 8/1999 | Green et al. |
| 5,953,355 A | 9/1999 | Kiely et al. |
| 6,018,421 A | 1/2000 | Cushing |
| 6,037,644 A | 3/2000 | Daghighian et al. |
| 6,048,029 A | 4/2000 | Percoco |
| 6,050,937 A | 4/2000 | Benderev |
| 6,075,647 A | 6/2000 | Braun et al. |
| 6,091,504 A | 7/2000 | Walker et al. |
| 6,166,381 A | 12/2000 | Augeri et al. |
| 6,180,529 B1 | 1/2001 | Gu |
| 6,194,721 B1 | 2/2001 | Bly |
| 6,265,242 B1 | 7/2001 | Komori et al. |
| 6,285,504 B1 * | 9/2001 | Diemeer ............... 359/578 |
| 6,300,648 B1 | 10/2001 | Mei et al. |
| 6,347,107 B1 * | 2/2002 | Roddy et al. ............ 372/49.01 |
| 6,392,233 B1 | 5/2002 | Channin et al. |
| 6,447,126 B1 | 9/2002 | Hornbeck |
| 6,483,862 B1 | 11/2002 | Aronson et al. |
| 6,487,342 B1 | 11/2002 | Wu et al. |
| 6,545,796 B1 | 4/2003 | Greywall |
| 6,582,985 B2 | 6/2003 | Cabuz et al. |
| 6,670,024 B1 * | 12/2003 | Yu ............... 428/209 |
| 6,670,599 B2 | 12/2003 | Wagner et al. |
| 6,737,648 B2 | 5/2004 | Fedder et al. |
| 6,768,097 B1 | 7/2004 | Viktorovitch et al. |
| 6,816,636 B2 * | 11/2004 | Cole et al. ............... 385/10 |
| 6,983,653 B2 * | 1/2006 | Iwaki et al. ............ 73/204.23 |
| 6,985,281 B2 | 1/2006 | Wagner et al. |
| 2001/0020680 A1 | 9/2001 | Cunningham et al. |
| 2002/0033453 A1 | 3/2002 | Sauer et al. |
| 2002/0080493 A1 | 6/2002 | Tsai et al. |
| 2002/0105652 A1 | 8/2002 | Domas et al. |
| 2002/0145139 A1 | 10/2002 | Wagner et al. |
| 2002/0185588 A1 | 12/2002 | Wagner et al. |
| 2002/0191268 A1 | 12/2002 | Seeser et al. |
| 2003/0066967 A1 | 4/2003 | Hashimoto et al. |
| 2003/0072009 A1 | 4/2003 | Domash et al. |
| 2003/0087121 A1 | 5/2003 | Domash et al. |
| 2003/0132386 A1 | 7/2003 | Carr et al. |
| 2003/0141453 A1 | 7/2003 | Reed et al. |
| 2004/0104334 A1 | 6/2004 | Carr |
| 2005/0105184 A1 * | 5/2005 | Ma et al. ............... 359/578 |

OTHER PUBLICATIONS

Domash, Lawrence, et al., Tunable And Switchable Multiple-Cavity Thin Film Filters, Journal Of Lightwave Technology, Jan. 2004, p. 126, vol. 22, No. 1.

Hohlfeld, Dennis, et al., An All-Dielectric Tunable Optical Filter Based On The Thermo-Optic Effect, Journal Of Optics A: Pure And Applied Optics, 2004, p. 504-511, vol. 6, Institute Of Physics Publishing, UK.

* cited by examiner

TUNABLE OPTICAL FILTER WITH HEATER ON A CTE-MATCHED TRANSPARENT SUBSTRATE

This application claims the benefit of U.S. Provisional Application No. 60/509,203, filed Oct. 7, 2003.

TECHNICAL FIELD

This invention generally relates to thermally tunable devices such as thermo-optically tunable thin film optical filters.

BACKGROUND OF THE INVENTION

There is a family of devices that are based on thermo-optically tunable, thin-film optical filters. These devices, which are made from amorphous semiconductor materials, exploit what had previously been viewed as an undesirable property of amorphous silicon, namely, its large thermo-optic coefficient. The performance of these devices is based on trying to maximize thermo-optic tunability in thin-film interference structures, instead of trying to minimize it as is often the objective for conventional fixed filters. The devices are characterized by a pass band centered at a wavelength that is controlled by the temperature of the device. In other words, by changing the temperature of the device one can shift the location of the pass band back and forth over a range of wavelengths and thereby control the wavelength of the light that is permitted to pass through (or be reflected by) the device.

The basic structure for the thermo-optically tunable thin film filter is a single cavity Fabry-Perot type filter 10, as illustrated in FIG. 1a. The Fabry-Perot cavity includes a pair of thin film multi-layer interference mirrors 14a and 14b separated by a spacer 16. The thin film mirrors are made up of alternating quarter wave pairs of high and low index films. The two materials that are used for the layers are a-Si:H (n=3.67) and non-stoichiometric SiNx (n=1.77). In addition the spacer ("cavity") also is made of amorphous silicon. To produce more complex pass band characteristics or more well defined pass bands, multiple cavities can be concatenated to form a multi-cavity structure.

To achieve control over the temperature of the device, at least some embodiments include a ZnO or polysilicon heater film 12 integrated into the multilayer structure. The heater film is both electrically conductive and optically transparent at the wavelength of interest (e.g. 1550 nm). Thus, by controlling the current that is passed through the film, one can control the temperature of the filter.

The thermal tuning that is achievable by this thermo-optically tunable filter is illustrated by FIG. 1b. The configuration used an amorphous silicon spacer with dielectric mirrors (tantalum pentoxide high index and silicon dioxide low index layers, deposited by ion-assisted sputtering, R=98.5% mirror reflectivity). That structure was heated in an oven from 25 C to 229 C. The tuning was approximately 15 nm or $d\lambda/dT=0.08$ nm/K.

SUMMARY OF THE INVENTION

In general, in one aspect, the invention features an optical device including: a glass substrate; a crystalline silicon layer bonded to the glass substrate; and a thermally tunable thin-film optical filter fabricated on top of the crystalline silicon layer.

Other embodiments include one or more of the following features. The optical filter is designed to operate on an optical signal of wavelength $\lambda$ and wherein the glass substrate is transparent to light of wavelength $\lambda$. The thermally tunable optical filter is a thermo-optically tunable thin film optical filter. The optical device also includes a heating element on the crystalline silicon layer and circumscribed about the optical filter. Alternatively, the optical device includes electrical contacts formed on the crystalline silicon layer for supplying electrical current to the silicon layer so as to use the silicon layer as a heater. The crystalline silicon heater layer is a doped crystalline silicon layer. The glass substrate is made of Pyrex or a borosilicate glass. The glass substrate is characterized by a CTE that is matched to the CTE of the optical filter. The thin film optical filter includes one or more layers comprising amorphous semiconductor, e.g. amorphous silicon. The thin film optical filter includes a plurality of thin film interference layers. At least some of the plurality of thin film layers is made of amorphous silicon. The optical filter is designed to operate on an optical signal of wavelength $\lambda$ and wherein each of the layers among the plurality of thin film layers has a thickness that is roughly an integer multiple of $\lambda/4$. The thin film optical filter includes a stack of multiple Fabry-Perot cavities.

In general, in another aspect, the invention features a method of making an optical device. The method includes: providing a glass substrate with a crystalline silicon layer bonded to the glass substrate; and fabricating a thermally tunable thin-film optical filter on top of the crystalline silicon layer.

Other embodiments include one or more of the following features. The silicon layer is a doped silicon layer and the method further includes fabricating electrical contacts on the silicon layer for supplying electrical current to the doped silicon layer. The method also includes, prior to fabricating the optical filter, patterning the silicon layer to form an island of silicon on which the optical filter is fabricated. The crystalline silicon layer is anodically bonded to the glass substrate. Fabricating the thermally tunable thin-film optical filter on top of the crystalline silicon layer involves fabricating a thermo-optically tunable thin film, optical filter.

The details of one or more embodiments of the invention are set forth in the accompanying drawings and the description below. Other features, objects, and advantages of the invention will be apparent from the description and drawings, and from the claims.

Figure 1A:
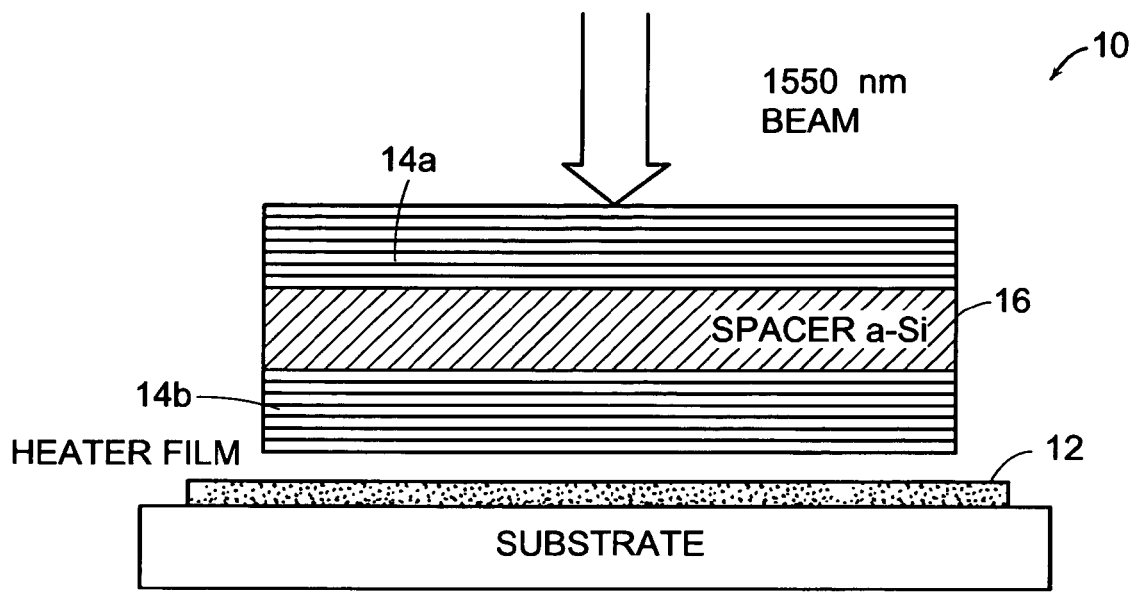
FIG. 1a shows the basic device structure of a thermo-optically tunable thin film filter.
Figure 1B:
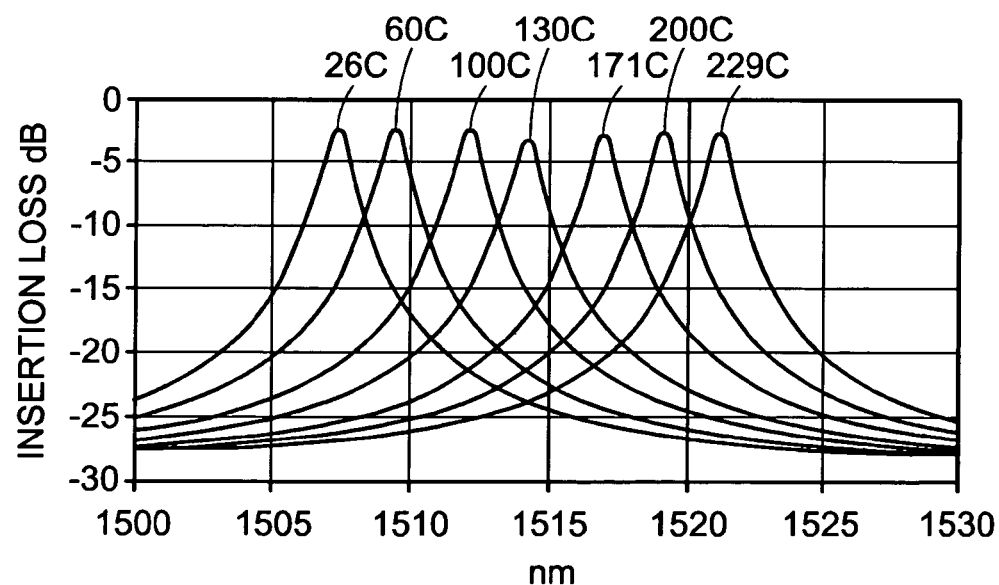
FIG. 1b presents multiple plots of filter transmission characteristics showing the tuning range of a filter with thermo-optic spacer and dielectric mirrors.

It should be understood that the figures are drawn for ease of illustration. The depicted structures are not drawn to scale nor are the relative dimensions intended to be accurate.

DETAILED DESCRIPTION

In general, a thermally tunable thin film optical filter is deposited directly on top of a doped single-crystal silicon sheet-resistive heater, which is in turn supported by a substrate that is transparent to the wavelength at which the optical filter is meant to operate. The substrate has a coefficient of thermal expansion (CTE) that is more closely matched to the CTE of the optical filter than is fused quartz silica that has been used in the past, thereby permitting the entire structure to expand and contract without experiencing excessive stress or resulting damaging when exposed to the large temperature excursions required for fabrication and for tuning. The method for fabricating this structure is as follows.

Referring to FIG. 2a-e, the process begins with an SOI wafer 400 that has a device layer 402 of the desired thickness. Device layer 402 is made of a high quality single-crystal silicon material and is bonded to an oxide layer (BOX layer) 406 that was formed on a handle layer 408. Because device layer 402 will become part of the stack of layers that make up the optical filter that is later deposited onto the silicon layer, its thickness needs to be precisely controlled so that it is roughly equal to some integer multiple of a quarter wavelength.

To achieve this level of thickness control, the "smart cut" process is used to fabricate the SOI wafer. The "smart cut" process uses two polished Si wafers, wafer A and wafer B and works as follows. An oxide is thermally grown on wafer A, after which hydrogen is implanted through the oxide layer and into the underlying silicon to a predetermined depth. Wafer A is then hydrophilicly bonded to wafer B under the application of pressure and a temperature of about 400-600° C. During a subsequent heat treatment, the hydrogen ion implantation acts as an atomic scalpel enabling a thin slice of crystalline film (of thickness d) to be cut from wafer A (i.e., the donor wafer) and transferred on top of wafer B (i.e., the receiving wafer). The bond between the thin slice of silicon and the oxide layer is strengthened by a second, subsequent anneal at about 1100° C. In the resulting structure, the thin crystalline Si film (generally referred to as the "device" layer) is bonded to the oxide film which is now firmly bonded to wafer B (also referred to as the "handle" layer). The device layer is typically 300-500 nm thick with high accuracy (about ±30-40 nm). A final light polish of the exposed Si-film surface is then carried out to ensure a very smooth surface.

Wafers that are made by this process are commercially available from S.O.I.TEC Silicon On Insulator Technologies (Soitec) of Bernin, France.

With the SOI wafer in hand, device layer 402 is then doped with an appropriate dopant (e.g. boron or phosphorous) by using any of a number of different available processes. In the described embodiment, it is ion implanted with the dopant 404 at a density that is needed to achieve the desired electrical conductivity. The implanted dopant is then activated by a high-temperature anneal, using standard semiconductor procedures. The anneal serves to ensure a constant dopant density throughout the thickness of device layer 402 so that effective electrical contact to this layer can be established through the "backside" of this layer, as described below.

Figure 2A:
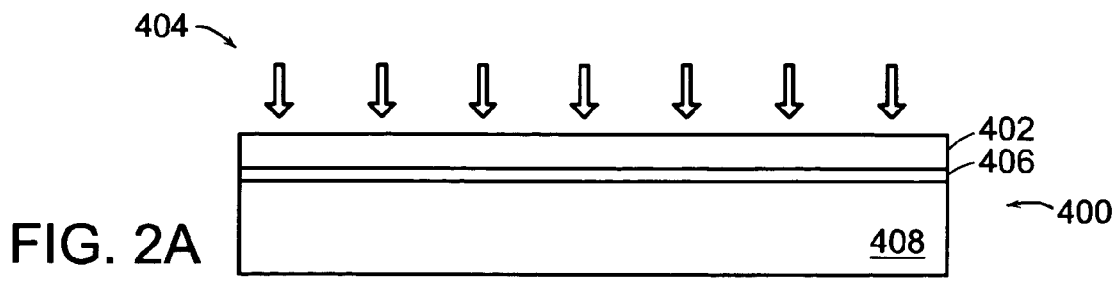
FIGS. 2a-e illustrate the fabrication of an integrated thermo-optic filter on a thin film heater that is implemented by a doped crystalline silicon resistive layer.
Figure 2B:
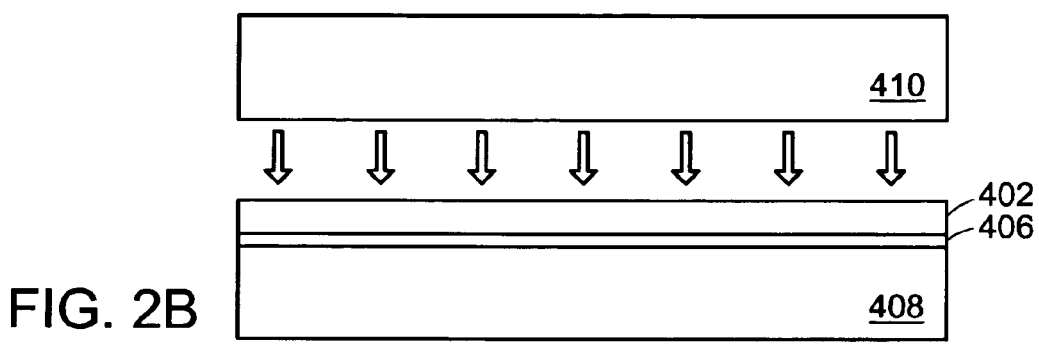
Figure 2C:
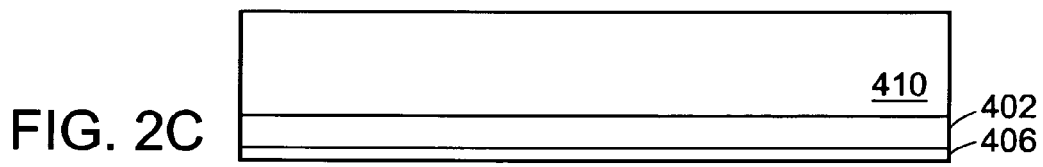

After the device layer 402 of SOI wafer 400 is doped, it is anodically bonded to an appropriate glass substrate 410, as depicted in FIG. 2b. The glass substrate is made of a material that has a CTE that is more matched with that of the filter stack (e.g. certain borosilicate glasses, Pyrex™ or Eagle 2000™ from Corning). After the CTE-matched substrate is attached to device layer 402, handle layer 408 of SOI wafer 400 is removed either by etching in a suitable reagent, e.g., KOH solution, or by a combination of mechanically lapping followed by etching. Note that, as described earlier, etching is automatically stopped by BOX layer 406 oxide layer that separates device layer 402 from handle layer 408. This produces the structure shown in FIG. 2c.

Figure 2D:
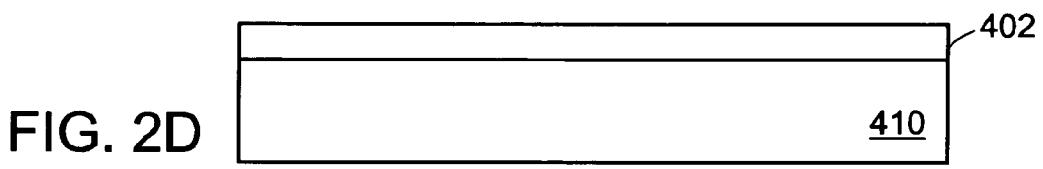
Figure 2E:
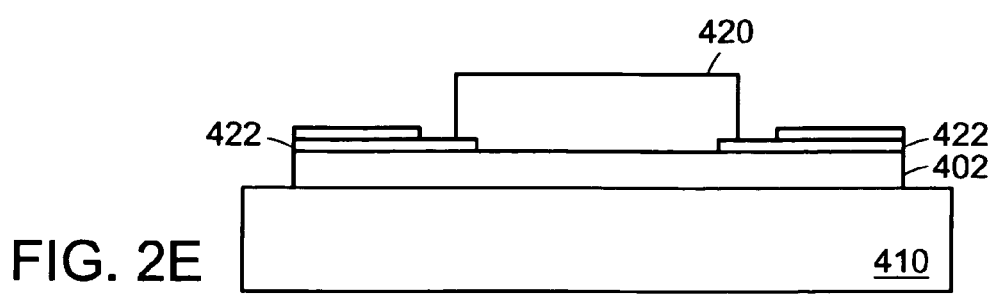

After handle layer 408 has been completely removed, BOX layer 402 is also removed by immersing the wafer in a suitable reagent, such as a buffered HF solution. This completely exposes the crystalline silicon layer 402, as shown in FIG. 2d. The exposed silicon device layer is then lithographically patterned to form an isolated region of doped silicon on top of substrate 410 and the optical element (e.g. the tunable optical filter stack) 420 is fabricated on top of the silicon regions. This is done by depositing the filter stack over the entire surface of the wafer and then lithographically patterning the deposited material to produce an individual isolated filer element on top of the silicon region. Next, electrical metal traces 422 along with associated contact pads 424 are fabricated on top of the doped silicon region to provide electrical connection to that material so that it can be heated by passing electrical current through it.

Previously, thermo-optic tunable filters were deposited on doped polysilicon films that were supported by a fused quartz substrate. The doped polysilicon films functioned as heaters to control the temperature of the thermally tunable filter.

Although these devices worked well, they exhibited the following problems. First, there was a large CTE mismatch between the filter-film/polysilicon structure and the underlying fused-quartz substrate. This mismatch was shown to cause high stresses which led to rupture and delaminate the filter-film/polysilicon structure when the device was driven to large temperature extremes by excitation of the heater with high drive currents or during the fabrication process itself. Second, the resistance of the doped polysilicon film was seen to gradually increase during device operation. This effect was believed to be caused by the diffusion of dopants to the grain boundaries in the polysilicon film, where they are trapped and rendered electrically inactive. Third, polysilicon film was typically microscopically rough because of its crystal-grain structure, thereby causing light to scatter as it passes through the filter-film/polysilicon structure. This scattering caused an increase in insertion loss and an increase in the line width of the filter.

The CTE-matched structure described herein introduces two fundamental changes to the previous designs that addresses these problems. First, it replaces the polysilicon heater with a single-crystal silicon heater. As described above, the benefits include stable heater resistance over time and reduced optical scattering which in turn leads to lower insertion loss and narrower filter peaks. Second, it replaces the fused silica substrate with a CTE matched substrate. Using such a substrate reduces the stress in the film, permitting thicker more complex film stacks to be grown as well as larger tuning ranges to be employed. In addition, the single-crystal silicon heater has a smoother surface and no grain boundaries, thereby reducing the insertion loss and increasing the adjacent channel rejection of the filter, which are critical in making multi-port devices and devices with tighter channel spacing.

Also, the thermo-optically tunable thin-film filter structures include films of amorphous silicon. It is desirable to maintain these films in the amorphous state during the lifetime of the device so that the thermal coefficient for its index of refraction remains high. However, these films can suffer slow micro-crystallization during device operation because of the high temperatures applied to the filter structure, thereby limiting the device lifetime. It is also known that micro-crystallization of amorphous Si films is accelerated by the presence of mechanical stress. Thus, the elimination of CTE mismatch between the film structure and the substrate appreciably reduces the stress imposed on the film structure, thereby also suppressing micro-crystallization, and leading to improved device lifetime.

The structure described above has particular usefulness in connection with the thermo-optically tunable thin film optical filters. But it can be used for other devices in which a heater with excellent electrical stability, high resistance to delamination and rupture, and/or good transparency in the IR without scattering is required.

Though the descriptions presented above generally focused on the fabrication of an individual device on a wafer substrate, in reality there will be many such devices fabricated on a single wafer and they will later be separated into individual components by cutting and dicing the wafer to produce many individual die.

Other embodiments are within the following claims.

What is claimed is:

1. An optical device comprising:
    a glass substrate;
    a doped single-crystal silicon sheet-resistive heater layer bonded to the glass substrate; and
    a thermally tunable thin-film optical filter fabricated on top of the doped single-crystal silicon sheet-resistive heater layer, the thermally tunable thin-film optical filter comprising at least one amorphous semiconductor layer, and having a coefficient of thermal expansion approximately matched to a coefficient of thermal expansion of the glass substrate.

2. The optical device of claim 1, wherein the optical filter is designed to operate on an optical signal of wavelength $\lambda$ and wherein the glass substrate is transparent to light of wavelength $\lambda$.

3. The optical device of claim 2, wherein the thermally tunable optical filter is a thermo-optically tunable thin film optical filter.

4. The optical device of claim 1 further comprising electrical contacts formed on the doped single-crystal silicon sheet-resistive heater layer for supplying electrical current to the doped single-crystal silicon sheet-resistive heater layer.

5. The optical device of claim 1, wherein the glass substrate is made of a borosilicate glass.

6. The optical device of claim 1, wherein the amorphous semiconductor is amorphous silicon.

7. The optical device of claim 1, wherein the thermally tunable thin film optical filter comprises a plurality of thin film interference layers.

8. The optical device of claim 7, wherein the optical filter is designed to operate on an optical signal of wavelength $\lambda$ and wherein each of the layers among the plurality of thin film layers has an optical thickness that is roughly an integer multiple of $\lambda/4$.

9. The optical device of claim 1, wherein the thermally tunable thin film optical filter comprises a stack of multiple Fabry-Perot cavities.

10. A method of making an optical device, the method comprising:
    providing a glass substrate;
    bonding a doped single-crystal silicon sheet-resistive heater layer to the glass substrate; and
    fabricating a thermally tunable thin-film optical filter comprising at least one amorphous semiconductor layer on top of the doped single-crystal silicon sheet-resistive heater layer, the thermally tunable thin-film optical filter having a coefficient of thermal expansion approximately matched to a coefficient of thermal expansion of the class substrate.

11. The method of claim 10, further comprising fabricating electrical contacts on the doped single-crystal silicon sheet-resistive heater layer for supplying electrical current to the heater layer.

12. The method of claim 10 further comprising, prior to fabricating the optical filter, patterning the doped single-crystal silicon sheet-resistive heater layer to form an island on which the optical filter is fabricated.

13. The method of claim 10, wherein the doped single-crystal silicon sheet-resistive heater layer is anodically bonded to the glass substrate.

14. The method of claim 10, wherein the fabricating the thermally tunable thin-film optical filter on top of the doped single-crystal silicon sheet-resistive heater layer involves fabricating a thermo-optically tunable thin film, optical filter.

* * * * *